US006944379B2

(12) United States Patent
Olbricht et al.

(10) Patent No.: US 6,944,379 B2
(45) Date of Patent: Sep. 13, 2005

(54) METHOD FOR TRANSFERRING A LARGE NUMBER OF FIBER ENDS INTO A SPECIFIED POSITION

(75) Inventors: Kai Olbricht, Wesel (DE); Markus Schuster, Mainz (DE)

(73) Assignee: Schott AG, Mainz (DE)

( * ) Notice: Subject to any disclaimer, the term of this patent is extended or adjusted under 35 U.S.C. 154(b) by 199 days.

(21) Appl. No.: 10/416,763

(22) PCT Filed: Nov. 16, 2001

(86) PCT No.: PCT/US01/43198

§ 371 (c)(1),
(2), (4) Date: Jan. 26, 2004

(87) PCT Pub. No.: WO02/41038

PCT Pub. Date: May 23, 2002

(65) Prior Publication Data

US 2004/0126070 A1 Jul. 1, 2004

(30) Foreign Application Priority Data

Nov. 16, 2000 (DE) ........................................ 100 57 129

(51) Int. Cl.$^7$ ................................................. G02B 6/04
(52) U.S. Cl. ........................................ 385/115; 385/52
(58) Field of Search .............................. 385/25, 26, 52, 385/115, 117–121, 136–139

(56) References Cited

U.S. PATENT DOCUMENTS

| 3,853,658 A | 12/1974 | Ney |
| 4,744,627 A | 5/1988 | Chande et al. |
| 5,146,532 A | 9/1992 | Hodge |
| 5,379,361 A | 1/1995 | Maekawa et al. |
| 6,072,932 A | 6/2000 | Bennett et al. |
| 6,542,676 B2 * | 4/2003 | Olbricht et al. ............. 385/115 |

OTHER PUBLICATIONS

Jun. 11, 2002 Search Report for PCT/US01/43198.
IPER for PCT/US01/43198.

* cited by examiner

*Primary Examiner*—Akm Enayet Ullah
*Assistant Examiner*—Michelle R. Connelly-Cushwa
(74) *Attorney, Agent, or Firm*—Volpe and Koenig, P.C.

(57) ABSTRACT

A method for transferring a large number of fiber ends of a bundle of light wave guides, especially glass, quartz or plastic fibers, into a large number of specified positions with the aid of an alignment apparatus which includes openings the size of which can be varied in a specified range. The method includes passing the glass, quartz or plastic fiber ends through the openings of the alignment apparatus, whereby the size of the openings are selected such that only one end of the large number of glass, quartz or plastic fiber ends can pass through each opening. The size of the openings is then reduced so that the glass, quartz or plastic fiber ends are moved to the specified positions.

12 Claims, 2 Drawing Sheets

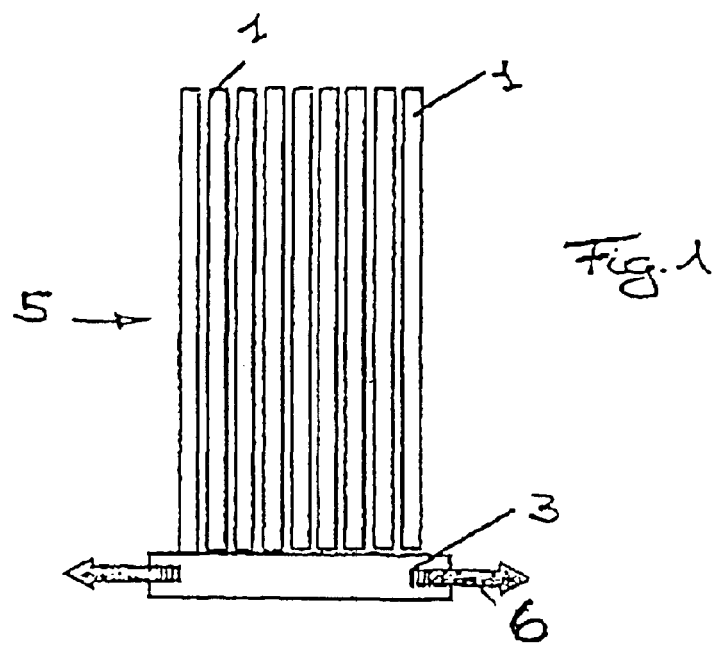
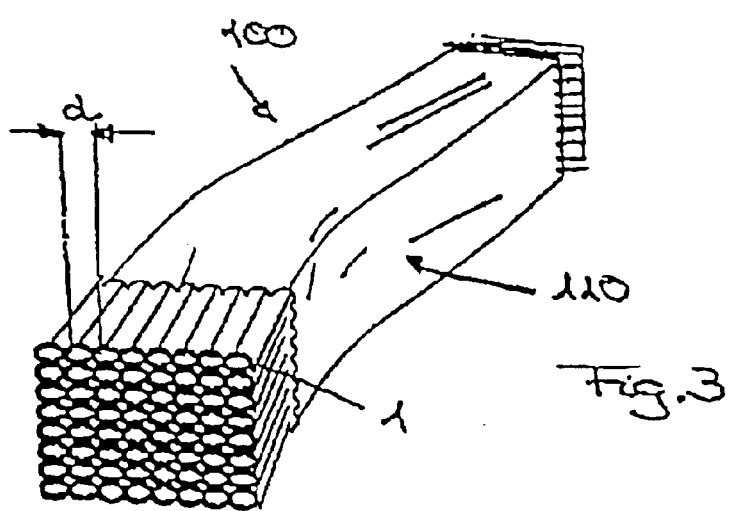

METHOD FOR TRANSFERRING A LARGE NUMBER OF FIBER ENDS INTO A SPECIFIED POSITION

BACKGROUND

The invention concerns a method for transferring a large number of fiber ends of a bundle of optical waveguides, especially glass, quartz or plastic fibers, into a large number of specified positions with an alignment apparatus which includes openings which vary in size in a specified range as well as a method for manufacturing a glass, quartz or plastic fiber ends which are connectable with a plug arrangement.

With glass fiber cables with a great number of glass fibers, it has up until now been customary to grasp the individual fibers manually and transfer them individually into a specified position.

In this way, for example, glass fibers could be arranged lying alongside one another, in a one dimensional array, and joined together to form a plug connector for a glass fiber cable.

The disadvantage in a process of this type was that this process is very expensive for an exact positioning of many glass, quartz and plastic fiber ends.

In particular, a process of this type does not permit transferring a two-dimensional glass fiber array with, for example, 2×2 to 40×40 glass fibers, into a connector so that a glass fiber cable with a large number of glass fibers in a two dimensional, for example square or rectangular matrix results. In particular, the processes according to the state of the art did not allow a very exact positioning, in the range of a few micrometers ($\mu$m), of a large number of closely spaced glass fiber ends.

SUMMARY

Consequently, it is the object of the invention to provide a method with which these disadvantages can be overcome, especially to provide a method which makes possible a very exact positioning in a two dimensional matrix with a spacing between the fiber ends of a few $\mu$m. In particular, in this way, a simplified point-to-point arrangement of two glass fiber ends is made possible. Furthermore, the procedure should permit an extensive automation in connection with the manufacture of glass fiber cables.

In accordance with the invention, this is achieved in that the fiber ends are passed through the openings of an alignment apparatus, in which the size of the openings have been selected such that at most one fiber end of a glass fiber, preferably without a protective layer, can pass through an opening. In a second step, the size of the openings are reduced so that the fiber ends arrive at the specified positions.

The advantage of a solution of this type is especially that the individual fibers can be transferred into positions lying very close alongside one another since with such a process very close distances, as, for example, are specified by the bar widths of an alignment apparatus, no problems arise in connection with positioning.

With such a method, glass fiber ends can be brought exactly into a position up to <±2 $\mu$m, whereby the individual glass fibers with core, cladding and protective coating can have a diameter of from 20 $\mu$m and preferably 100 $\mu$m to 1000 $\mu$m, and most preferably 260 $\mu$m. The stripped glass fiber ends without protective coating include a core and cladding and can have a diameter in the 50 to 800 $\mu$m range.

One configuration for the alignment apparatus is constructed in the form of a perforated plate, whereby the individual openings are formed by bars. In a first position, the size of the opening is selected such that at most a stripped glass fiber end without protective coating can pass through. This provides, in comparison to a perforated plate having fixed distance openings, a relatively large-meshed net. The bars are slidable to a second position, in which they define a fine-meshed net where each position of the individual openings corresponds to the desired position of the glass fiber end in a glass fiber array.

Preferably, distance between bars is selected to be <105 $\mu$m in the first position and <95 $\mu$m in a second position. The diameter of the individual bars corresponds to the standard distance between the individual glass fibers in the desired glass fiber matrix.

The alignment apparatus of the invention with flexible matrix-permits, first of all, the individual fibers to be able to be introduced into a relatively broad opening, the size of which must be selected so that in the first position, the entry of a second fiber is prevented. The opening size for exact positioning of the individual fibers is then selected such that the spacing between the bars corresponds to the diameter of the glass fiber ends.

A solution of this type has, for example, in comparison with a fixed matrix, the advantage that it can almost be ruled out that individual fibers do not extend through the holes and must be repositioned in an expensive repair process in the traditional manner.

A further advantage is that the fibers can at the same time be guided by several alignment apparatuses, whereby the size of the openings of each individual alignment device is individually adjustable.

Passing the fiber ends through the coarse-meshed net is assisted by the glass fiber ends and/or the alignment apparatus being periodically moved, especially set into vibration. This can take place by shaking.

In addition to the method of the invention for positioning, the invention also provides a method for manufacturing glass fiber ends to form a plug connection which includes a large number of individual glass fibers.

Only with an assembly technique of this type is it possible to make available a glass fiber cable at a reasonable manufacturing expense with a two dimensional glass fiber array which can be used, for example, in the area of optical data communication.

A process of this type for manufacturing glass fiber ends which can be used to form a plug connection includes the step of positioning the individual glass fibers with the aid of the method of the invention, into a preliminary alignment of the fiber ends and then into a final fixed arrangement. The final fixed arrangement of the fiber ends can, for example, be attained by filling the spaces between the fiber ends with a casting or potting material and subsequent hardening. This final fixed arrangement can, for example, be incorporated into a plug connector.

After introducing such an end of a glass fiber cable with glass fibers which are arranged in a two dimensional matrix into a plug arrangement, it is necessary for a sufficient optical quality connection, for the glass fiber ends of the glass fibers to be ground and polished so that the glass fiber array defines a smooth plane.

For a sufficiently good positioning in a glass fiber array, it is necessary for the glass fiber ends to be individual glass fibers without any protective coating. That is, the glass fiber ends are merely comprised by the glass fiber core and the glass cladding.

Preferably plastic and/or an adhesive are used as casting or potting material.

BRIEF DESCRIPTION OF THE DRAWINGS

The invention is to be described below on the basis of the preferred embodiments. Although the preferred embodiments relate to glass fibers as optical waveguides, the method of the invention can also be used on other optical wave guides, such as, for example, quartz or plastic fibers, without deviating from the invention.

In the drawings:

FIG. 1 is a side elevational view of a preferred construction for implementing the method of the invention whereby the passage of the glass fiber ends through the openings of the alignment device is assisted by motion, FIG. 3 is a perspective view of a glass fiber cable manufactured using the method of the invention with a large number of glass fibers arranged in a two dimensional matrix.

DETAILED DESCRIPTION OF THE PREFERRED EMBODIMENTS

FIG. 1 shows a preferred structure for positioning a large number of glass fiber elements with the aid of an alignment apparatus 3 with variable openings.

Clearly recognizable is the great number of glass fiber ends 1 of the glass fiber cable. Each individual glass fiber of the glass fiber cable is formed of a glass fiber core, a cladding or cladding glass, as well as a protective layer which surrounds the cladding or cladding glass.

For positioning the individual glass fiber ends 1 the glass fibers in accordance with the method of the invention, the protective layer is removed from the individual glass fibers in the region of the fiber ends 1. The individual glass fiber ends 1 are transferred to an alignment apparatus 3 which is constructed generally in the form of a perforated plate formed from individual bars, whereby the bars of the invention can be moved to provide a variable bar distance so that openings with various opening diameters are formed.

The opening size is so dimensioned in a first position that preferably at most one fiber end, including core and cladding, but not the protective layer, can pass through the opening. The perforated plate is a relatively coarse-meshed matrix in this position.

If now the bundle 5 of fiber ends 1 is placed on the perforated plate 3, then the individual glass fiber ends 1 pass through the openings and are roughly positioned.

Due to the large openings, 100% of the stripped fiber ends fall through the openings and can thus be prepositioned.

Should all the holes not be filled and individual fibers of the great number of glass fibers not pass through the perforated screen, these individual fibers can be manually reprocessed.

To come from the very crude positioning to the very closely toleranced array, the individual wires which form the bars can be pushed together. The tolerance of the individual positions lies in the telescoped array in the $\pm 0.5\,\mu m$ to $\pm 2\,\mu m$ range. In order to obtain low tolerances of this sort, the individual bars are kept at a distance by spacers in the pushed-together position.

After the individual glass fibers have been transferred into the specified positions through the fine-meshed matrix and there temporarily aligned, the glass fiber ends present in an ordered matrix are affixed in the aligned position, for example by means of a casting material or potting material. Preferably, the fiber ends are coated with a plastic/adhesive that is subsequently hardened. In this way, a fixed alignment of the fiber ends in the desired position is attained.

Subsequently, the cable end produced in this way can be ground and polished true so that a planar fiber array is obtained. The rough positioning of the glass fiber ends can be assisted by moving or vibrating the alignment apparatus and/or the glass fiber ends.

Figure 2A:
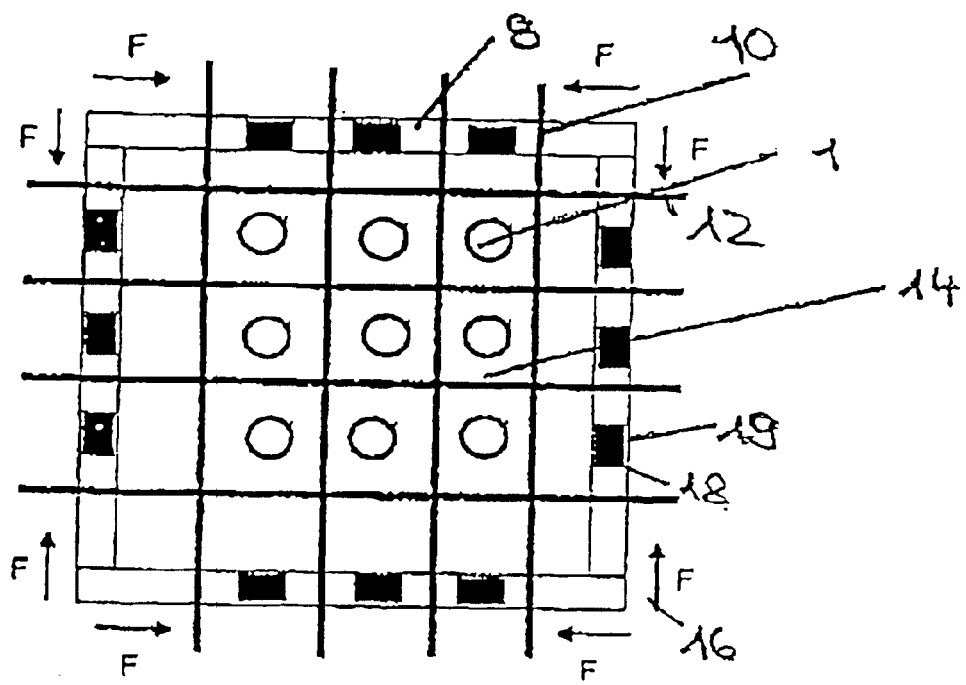
FIG. 2A is a plan view of the alignment apparatus with spacers which in the closed state guarantee a defined distance, whereby the bars are situated in a first position, to produce a coarse-meshed net.
Figure 2B:
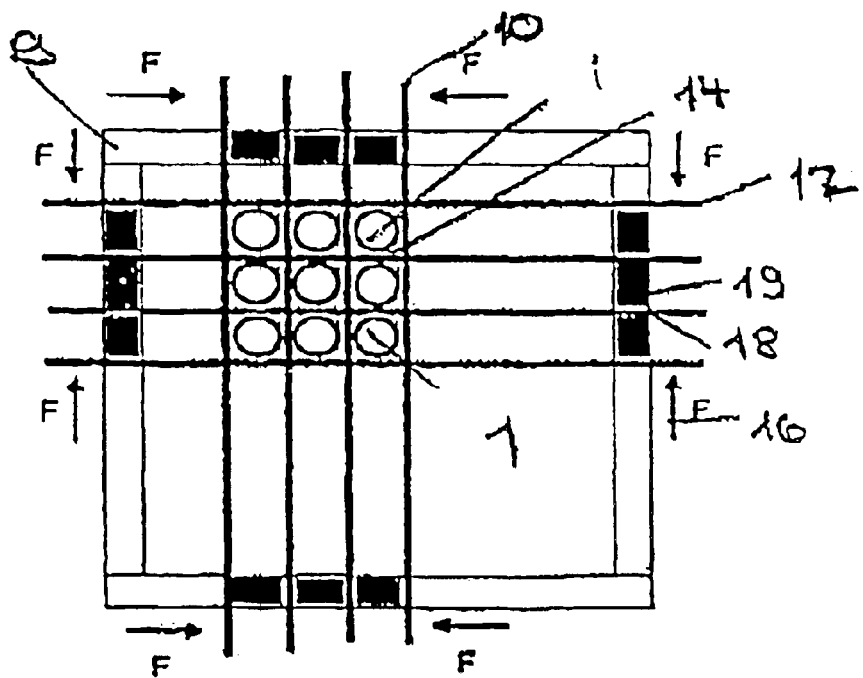
FIG. 2B is a plan view of the alignment apparatus of FIG. 2A with spacers, whereby the bars are in the second position, producing the fine-meshed net.

A preferred configuration of the flexible alignment device of the invention which is configured as a matrix is represented in FIGS. 2A and 2B.

The flexible matrix includes a supporting frame 9, a system of cross bars 10, 12 which define a large number of openings 14 in the matrix structure. The distance between the bars is set such that the insertion of a second fiber through any of the openings is prevented. The diameter of the individual bars corresponds to the standard distance between the individual glass fibers in the array to be produced whereby the bar widths are advantageously smaller than the diameters of the glass fiber ends.

As represented in FIG. 2A, the bars in this first position form a relatively coarse-meshed net.

After the individual fibers have been transferred into the large openings 14 of the coarse-meshed net of the flexible matrix, the rods are moved in the direction of arrow 16 to stop 18 and spaced apart by a set distance by spacers 19. In the fine meshed net represented in FIG. 2B, the individual glass fiber ends 1 are tightly packed into a matrix and are spaced apart by a distance which corresponds to the bar width of the individual bars 10, 12, whereby the diameter of the bars is preferably smaller than the diameter of an individual glass fiber end.

In FIG. 3, a glass fiber cable 100 which was manufactured according to the method of the invention is represented. The glass fiber cable 100 includes a large number of glass fiber ends 1 which are arranged in an array. The size of the array can, for example, be 10×10 or 35×35, or any other desired size, and can also be a non-square, rectilinear glass fiber array with, for example, 16×32 glass fibers. The distance d of the individual fiber cores to one another comes to $125\,\mu m$ in the present embodiment, the tolerance in the placement deviation is $\pm 3\,\mu m$. The individual glass fibers are preferably formed of a glass fiber core with a diameter in the $50\,\mu m$ range, a cladding, which surrounds the glass fiber core, as well as a protective coating. One preferred glass fiber with protective layer has a diameter of approximately 110 to 120 $\mu m$. Of course, arrays with other arrangements or with glass fibers with a different dimensioning are also possible without deviating from the invention.

Preferably, a casing 110 surrounds the large number of fibers.

Quartz, other types of glass or a plastic material can be used as glass fiber material. The glass fiber surface includes an acrylate coating. Multi-modal as well as single mode fibers can be used.

A complete glass fiber cable results when a plug connection is placed at both ends of the array of glass fibers.

With the method of the invention, it is possible for the first time to manufacture a glass fiber cable which includes a multi-dimensional matrix of individual glass, quartz or plastic fibers in an ordered arrangement. The advantage of the method in particular lies in that it is herewith possible for the first time to create a glass, quartz or plastic fiber array where the distance between the individual glass, quartz or plastic fibers is smaller than the diameter of the individual fibers, whereby the positioning within the array has tolerances in the range of $\pm 2$–$\pm 0.5$ $\mu$m.

What is claimed is:

1. A method for transferring a plurality of fiber ends of a bundle of optical wave guides into a plurality of specified positions, comprising:

(a) providing an alignment apparatus which includes openings having sizes which can be varied in a specified range;

(b) selecting a first opening size such that only one end of the plurality of fiber ends can pass through the opening;

(c) passing the fiber ends through the openings of the alignment apparatus;

(d) reducing the size of the openings to a second, reduced opening size so that the plurality of fiber ends are moved into the specified positions.

2. Method according to claim 1, wherein the aligning device includes at least one flexible matrix with openings in the form of a perforated plate.

3. Method according to claim 2, wherein the flexible matrix is comprised of moveable bars, the method further including adjusting a distance between the bars to place the bars in a first position to define the openings with the first opening size such that at most one fiber end without a protective coating can be inserted, and after passing the fiber ends through the openings, adjusting the distance between the bars to place the bars in a second position which corresponds to the second opening size so that the distance between the bars corresponds to a diameter of the fiber ends.

4. Method according to claim 3, wherein the distance between bars in the first position is about 105 $\mu$m, and the distance between the bars in the second position is <95 $\mu$m.

5. Method according to claim 1, further comprising moving or vibrating at least one of the fiber ends and the alignment apparatus.

6. Method of claim 1, wherein the fiber ends are at least one of glass, quartz and plastic.

7. Method for manufacturing an end of a fiber cable having a plurality of individual fiber ends into a plug connection, comprising:

(a) providing an alignment apparatus which includes openings having sizes which can be varied in a specified range;

(b) selecting a first opening size such that only one end of the plurality of fiber ends can pass through the opening;

(c) passing the fiber ends through the openings of the alignment apparatus;

(d) reducing the size of the openings to a second, reduced opening size so that the plurality of fiber ends are moved into the specified positions;

(e) temporarily holding the fiber ends in the specified positions with the alignemnt apparatus; and (f) fixing the fiber ends in the specified positions.

8. Method according to claim 7, wherein the fixing of the fiber ends comprises casting with at least one of a casting, potting and adhesive material around the fiber ends to at least partially fill spaces between the fiber ends, and subsequent hardening of the casting material.

9. Method according to claim 8, wherein the fiber ends are formed from fibers from which a protective coating is removed.

10. Method according to claim 9, wherein the protective coating of the fibers comprises less than 50% of an overall diameter of the fibers.

11. Method according to claim 7, wherein the fiber ends are ground and polished, resulting in a fiber array.

12. Method of claim 7, wherein the fiber ends are glass, quartz or plastic.

* * * * *